United States Patent [19]

Wiley et al.

[11] Patent Number: 5,439,189
[45] Date of Patent: Aug. 8, 1995

[54] BLIND MOUNT FOR AN ENGINE EXTERNAL UNIT

[75] Inventors: Walter H. Wiley, Palm Beach Gardens; David L. Sanford, Stuart, both of Fla.

[73] Assignee: United Technologies Corporation, Hartford, Conn.

[21] Appl. No.: 170,573

[22] Filed: Dec. 20, 1993

[51] Int. Cl.⁶ .............................. B64D 27/00
[52] U.S. Cl. ...................... 244/54; 248/544; 248/554; 248/603; 403/316
[58] Field of Search .............. 244/53 R, 54; 248/544, 248/554, 603; 403/316

[56] References Cited

U.S. PATENT DOCUMENTS

| | | | |
|---|---|---|---|
| 2,400,248 | 5/1946 | Morgan | 248/554 |
| 2,783,003 | 2/1957 | Ralston et al. | 244/54 |
| 2,815,184 | 12/1957 | Westphal et al. | 244/54 |
| 2,999,125 | 9/1961 | Young | 403/316 |
| 3,217,490 | 11/1965 | Chilvers | 244/54 |
| 4,269,075 | 5/1981 | Crist et al. | 403/316 |
| 4,300,737 | 11/1981 | Byrne et al. | 403/316 |
| 4,346,861 | 8/1982 | Legrand et al. | 244/54 |
| 4,946,116 | 8/1990 | Hoek | 248/554 |

Primary Examiner—Galen L. Barefoot
Attorney, Agent, or Firm—Norman Friedland

[57] ABSTRACT

Means for mounting an engine component to the exterior of an engine's case that is mounted in an aircraft with limited access including a blind mount. The mount includes an elongated bracket fixed to the exterior of the engine case with a clevis at one end of the bracket to receive a blind mount on said engine component. Camming means operatively connected to an accessible torquing member secures the engine component in place. Hook elements on the bracket engage said engine component to allow the operator to free his hands to operate the torquing means. The mount is designed to be compatible with the existing vibratory isolation system built into the engine component.

10 Claims, 5 Drawing Sheets

BLIND MOUNT FOR AN ENGINE EXTERNAL UNIT

This invention was made under a U.S. Government contract and the Government has rights herein.

TECHNICAL FIELD

This invention relates to external mounts for a gas turbine engine powering aircraft and particularly to a blind mount and means for retaining the unit in place to allow the operator to secure it into position.

BACKGROUND ART

Maintenance of aircraft and particularly the engines powering these aircraft is often hindered by the location of the particular component being maintained. In certain aircraft the component being maintained requires a blind mount to assemble and disassemble the unit. This is particularly so when the component is on or adjacent to the inboard side of the engine of a twin engine aircraft. As the component is always mounted on the same side of the engine, on one engine the component is away from the fuselage and readily accessible, although this may not always be the case. However, on the other engine the component and hence the access door is adjacent to the other engine and its supporting structure making accessibility difficult and cumbersome.

As mentioned above it is typical in these installations that the fuselage and engine and/or its supporting structure limits the available working space. Thus, certain mounts not only are practically inaccessible, but they often are difficult, if not, impossible to see. Although the aircraft includes access doors, because of these types of locations, it is necessary to include a blind mount to secure the component and also, in certain instances provide means for holding the unit in place while the operator or maintenance personnel attaches the unit by securing fasteners to positively securing it in its desired location.

This invention contemplates a blind mount that includes a clevis with a self guiding ramp and slot including a camming arrangement that clamps one end in place, remote tightening and loosening means engageable with the camming arrangement and means for holding the component in position to allow the operator to free himself from holding the component while he attends to securing it in place. In installation where the component is mounted on vibration isolators the mounting bracket must assure that the component when assembled provides a predetermined spring rate to the assembled component so as to prevent adverse vibration properties that would otherwise interfere with the operation of the isolators with possible harm to the components being attached.

SUMMARY OF THE INVENTION

This invention provides improved means to removably attach a component to a blind mount on an engine assembled in aircraft.

A feature of this invention is to provide a substantially flat bracket attached to the outer casing of the engine and having a clevis with a guide ramp and slot for being removable attached to a remote lug, button or pedestal formed integrally on the component being mounted or on a vibration isolator that is attached to that component. A two piece cam arrangement supported in the clevis and operatively connected to a remote mounted torque wrench rotatably supported to the bracket urges the camming element to secure the component to the engine.

A feature of this invention is an attachment as described including hooking means judiciously located in order to hold the component in position so as to allow the maintenance personnel to secure it into place.

A feature of this invention is a light weight bracket for a remote blind mount to attach/detach a component to the exterior of an engine assembled in aircraft that is characterized as being lighter, less expensive and easier to assemble and disassemble than heretofore known brackets intended for identical use.

Another feature of this invention is to provide remote mounting means for a blind mount for an engine component mounted on vibration isolators and attaching the component so as to maintain a given spring rate so as not to impair the function of the vibration isolator.

This invention includes the method of removably mounting a component to the exterior of an engine assembled in an aircraft The foregoing and other features of the present invention will become more apparent from the following description and accompanying drawings.

BEST MODE FOR CARRYING OUT THE INVENTION

Figure 1:
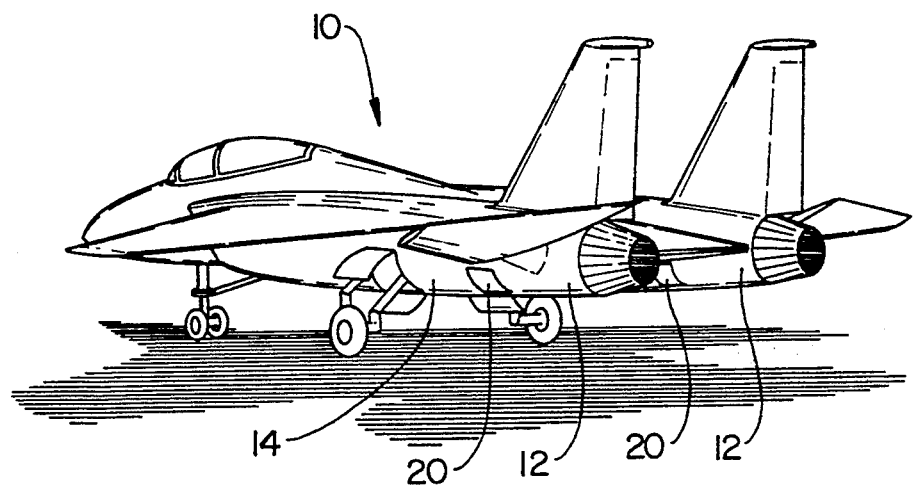
FIG. 1 is a perspective view of an engine mounted on the aircraft illustrating the access door for gaining accessibility to the engine component.

As mentioned above, the problem solved by this invention is the accessibility for mounting and removing a component on a gas turbine engine that is mounted in an aircraft. As noted in FIG. 1, the aircraft generally illustrated by reference numeral 10 includes two (2) engines 12 mounted in the bulbous portion of the fuselage 14. As is typical in these installations an access door 20 is provided in the fuselage to allow the maintenance personnel to gain accessibility to the engine and its components.

Figure 2:
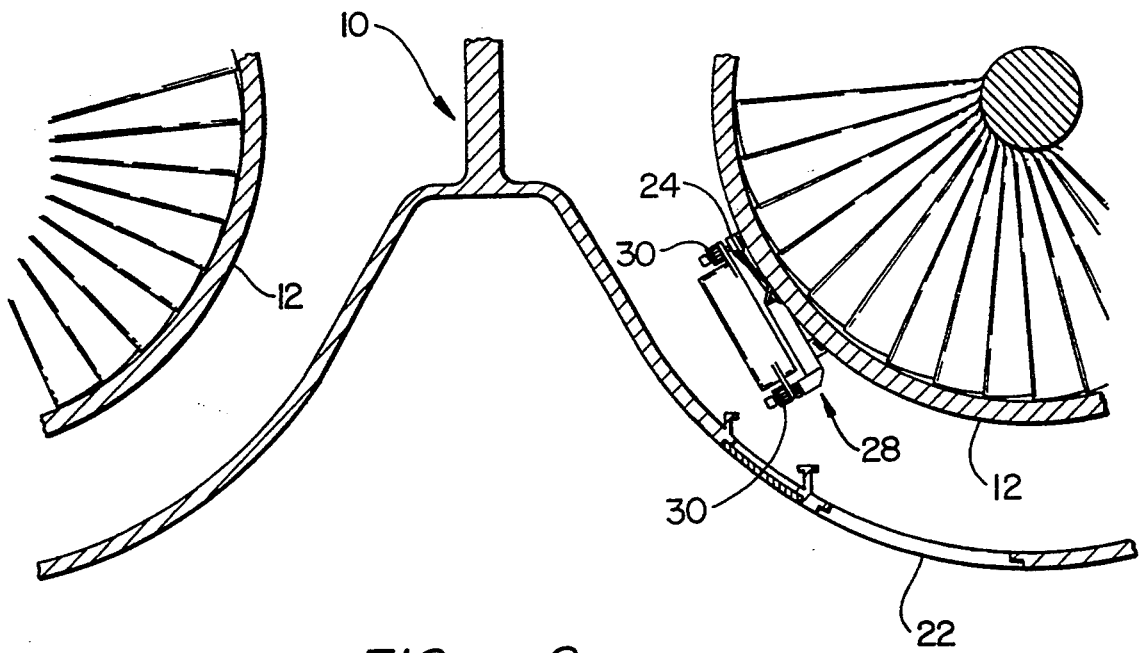
FIG. 2 is a fragmentary end view partly in section and partly in elevation illustrating the component mounted to one of the two engines of the aircraft.
Figure 3:
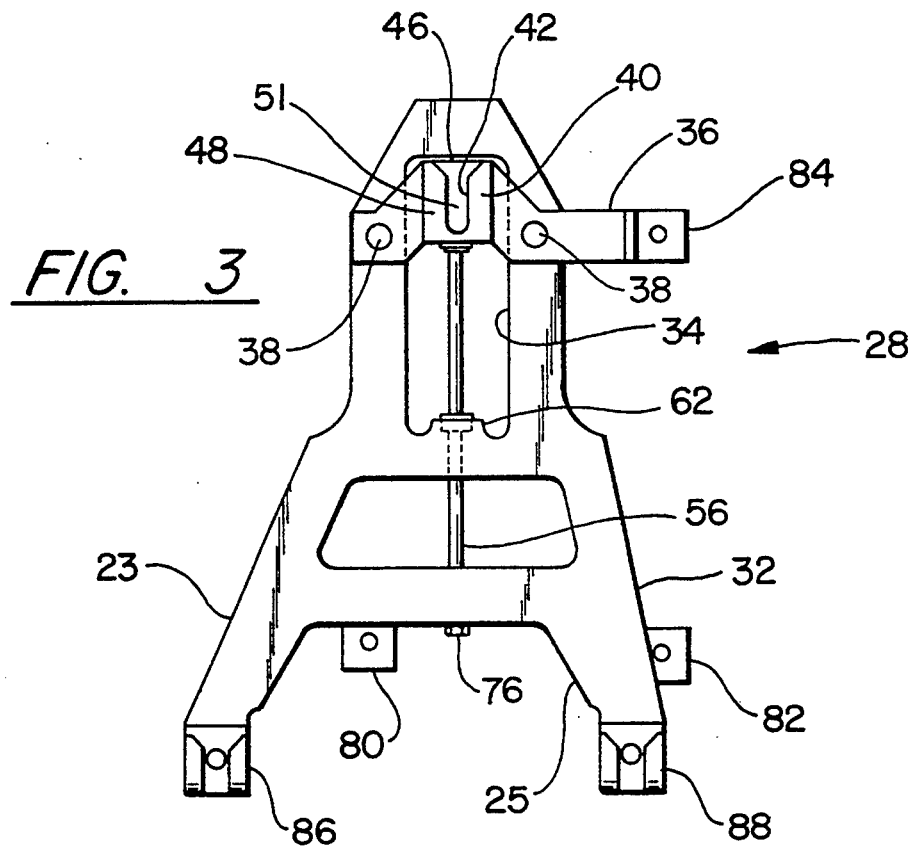
FIG. 3 is a view in elevation illustrating the bracket of this invention.
Figure 4:
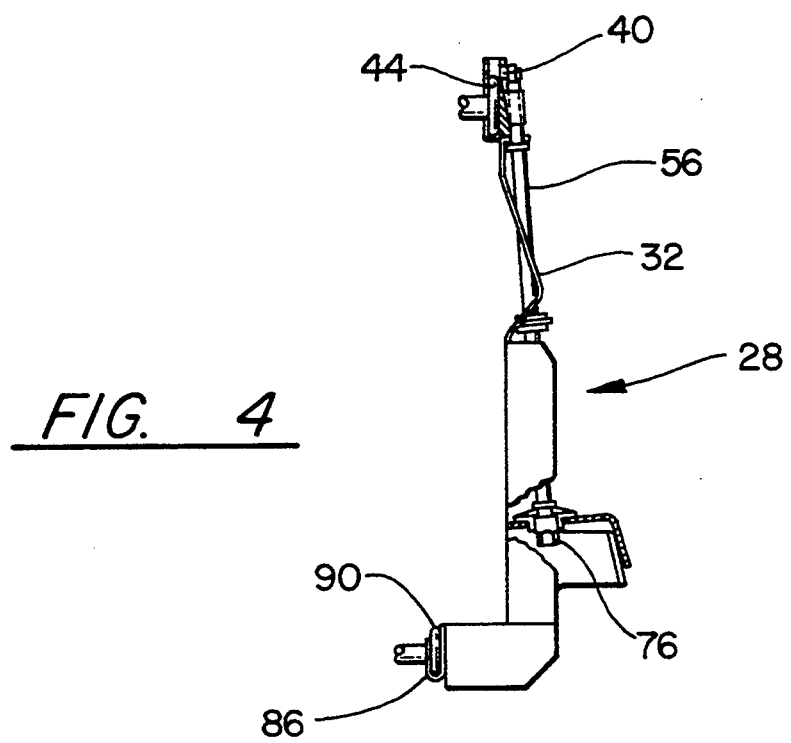
FIG. 4 is a side elevation view partly in section of the embodiment depicted in FIG. 3.
Figure 5:
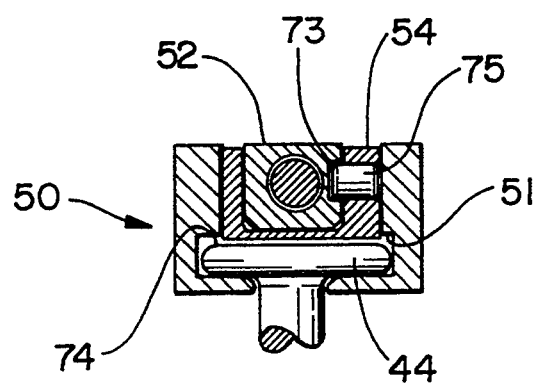
FIG. 5 is a fragmentary view partly in section and partly in elevation illustrating the locking mechanism of this invention.
Figure 6:
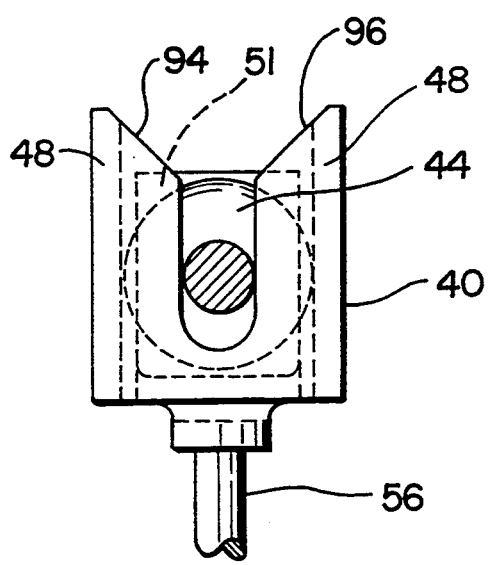
FIG. 6 is a partial plan view partly in section illustrating the locking mechanism depicted in FIG. 5.
Figure 7:
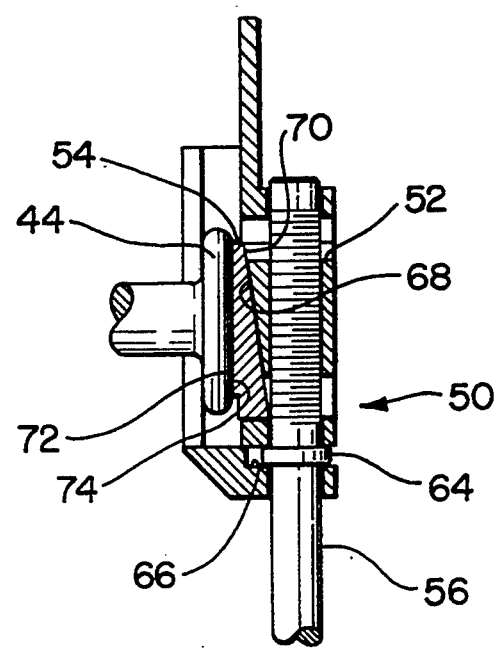
FIG. 7 is a partial view partly in section and partly in elevation illustrating the locking mechanism in the locked position.
Figure 8:
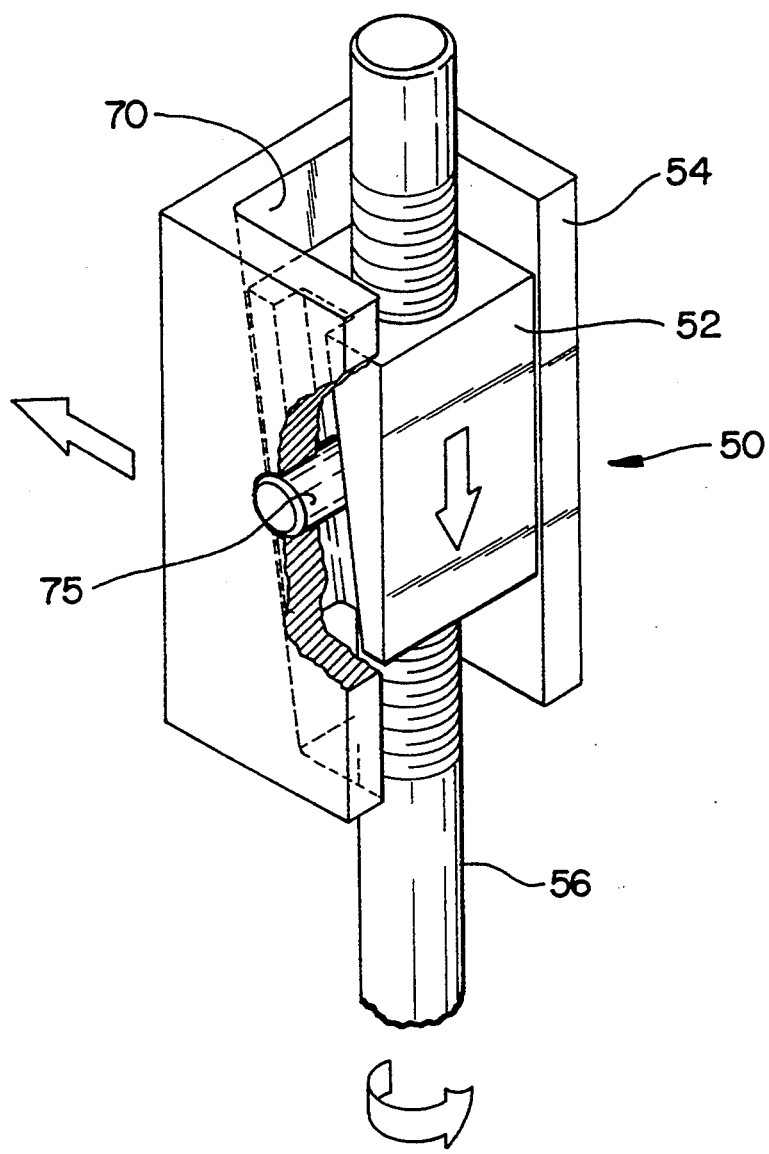
FIG. 8 is a perspective view illustrating the cam locking mechanism of this invention.
Figure 9:
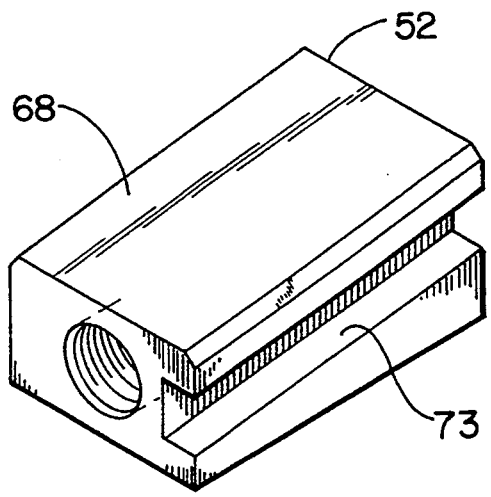
FIG. 9 is a perspective view of a portion of the cam locking mechanism illustrated in FIG. 8.
Figure 10:
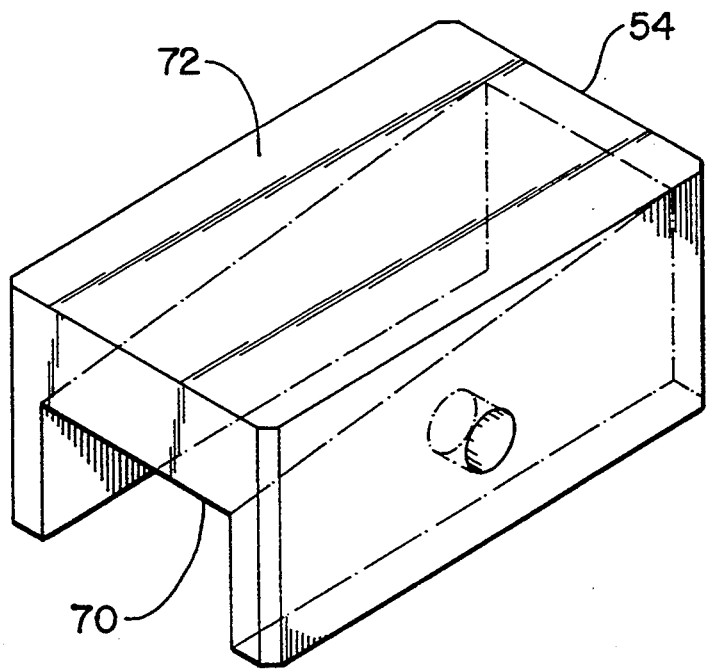
FIG. 10 is a perspective view of the mating member of the cam locking mechanism illustrated in FIG. 9.

As more clearly illustrated in FIG. 2 the access opening 22 in the fuselage 20 makes the access to the upper mount 24 virtually impossible. This invention provides means to achieve positive mounting with a remote tightening means. In this instance the component is a comprehensive engine diagnostic unit (CEDU) but as one skilled in this art will appreciate, the invention is not limited to attaching this type of component as it can be equally utilized to mount other types of components that require the solution to the problem solved by this invention.

The invention can best be understood by referring to FIGS. 2–7 that illustrate the details of this invention and show the CEDU in the mounted position. As noted in FIG. 2 the CEDU 26 is supported to the bracket of this invention generally illustrated by reference numeral 28. As is typical in these types of installations suitable isolators 30 for damping vibratory motion are utilized and are attached to the mounting locations of the CEDU that are provided by its manufacturer. Isolators are well known and for the sake of simplicity and convenience a detailed explanation of these devices are omitted herefrom. Suffice it to say that the isolators which may be a pair of coil springs mounted back to back on the attaching mechanism of the component require certain considerations in the design of the brackets that serve to attach the component so as not to adversely affect the operation thereof as will be described in further detail hereinbelow.

The bracket 28 of this invention is comprised of a relatively thin sheet metal elongated base member 32 having a pair of arms 23 and 25 disposed at the bottom end thereof and a rectangularly shaped aperture 34 formed adjacent to the upper end thereof. Cross bracket 36 attached to the base member 32 by any suitable means, such as rivets 38, extends laterally relative to the base member 32 and is disposed to overlie a portion of the aperture 34. Clevis 40 machined in the cross bracket 36 attached to base member 32 defines a recess 42 for releasably accepting button or pedestal 44 of the type that typically extends from the isolators and that are rigidly attached to the CEDU 26.

Clevis 40 includes a back wall 46 and a pair of opposing lips 48 spaced relative to back wall 46 to define a pocket 51 complementing the size of the button or pedestal 44. The space is sufficiently deep to allow the button or pedestal 44 to freely slide into and out of pocket 51 of clevis 40. The cam mechanism generally indicated by reference numeral 50, as detailed in FIGS. 5–8, is mounted in pocket 51 of clevis 40 and serves to lock the CEDU in place as will be described in further detail hereinbelow.

Cam 50 comprises a tapered block element 52 and a complementary tapered block element 54. Tapered block member 54 includes a U-shaped recess for accommodating the tapered block member 52 such that the surfaces formed by the tapered portion are in sliding relationship relative to each other. A torquing member 56 includes threads formed at the end thereof and threadably engages complementary threads formed in block 52 and is supported for rotary motion in the base member by an aperture formed in the outwardly bent portion 62 depending from base member 32 adjacent to the bottom of aperture 34 and the annular flange 64 that fits into the slot 66. The supports for the torquing member 56 allow rotary movement while restraining axial movement.

It is apparent from the foregoing that rotation of torquing member 56 will position block element 52 to ride up and down the ramp provided by the tapered sides 68 and 70 to urge the top surface 72 of tapered block 54 to bear against the complementary surface 74 of button or pedestal 44 and tightly fasten the CEDU unit into place. Anti-rotational means in the form of axial slot 73 formed in block 52 and pin 75 attached to block 54 protrudes into the slot 73 and travels rectilinearly therein and prevents the blocks from rotating relative to each other. In addition to the anti-rotation function slot 73 serves to insure the installation and removal of button or pedestal 44 as will be explained immediately below. The curvature of slot 73 is such that it provides means to force black 52 to move slightly. This slight movement serves to provide a gap at surface 74 between the button or pedestal 44 and the surface 72 of block 54. This clearance obviates the necessity of having to mechanically force the components of this cam apart.

Tool engaging means 76, which may take any suitable form, such as a recess for accepting an allen type wrench and the like, is provided at the remote end of torquing member that is accessible to the maintenance personnel through the access door.

Base member 32 and cross bracket 36 are bent at judicious locations and carry suitable tangs so as to be attached to the engine case by suitable means such as lugs or bolts and the like. In this installation the tangs 80 and 82 bent and extending from base member 32 and tang 84 bent and extending from cross bracket 36 bear against the engine case and are suitably attached thereto by suitable lugs extending through the apertures formed therein.

Arms 23 and 25 are discretely bent outwardly relative to the CEDU and carry a bent U-shaped clip portions 86 and 88 that releasable holds the button or pedestals 90 (one being shown) rigidly supported to the CEDU. This serves to hang the CEDU in position prior to the applying the torquing means so as to allow the operator to free himself from holding the CEDU while he torques the torquing means to lock it into position.

The following description describes the method to install and remove the CEDU from the engine. Bracket 28 is attached to installed on the engine as described above prior to the engine being installed in the aircraft. To install the CEDU the cam mechanism 50 is retracted to allow the button or pedestal to slide in the space provided by the recess. Guides 94 and 96 formed on the clevis help guide the button or pedestal 44 of the CEDU into the pocket 51. The bottom of buttons or pedestals 90 of the CEDU are inserted in clips 86 and 88 to hang the CEDU in place. The operator then can free himself from the CEDU and with bolts (not shown) secure the bottom of base member 32 of bracket 28 to the CEDU and with the appropriate tool tighten the cam 50 to secure the upper end to button or pedestal 44 by torquing the torquing member 56. To assure the proper torque on the button or pedestal 44, the torquing member 56 is rotated until the surface 74 of button or pedestal 44 and the top surface 72 of block 54 are in engagement which will be evident by the feel of the tool. The torquing member 56 is then referenced to a point and the torquing member is rotated in the same direction a predetermined number of times, say one, for urging the mating surfaces closer to each other. This assures that the CEDU is securely held in position, but also assures that the spring rate of the bracket is at the proper design point so as not to adversely affect the operation of the isolators.

Obviously, retracting the CEDU requires substantially the reverse steps. The torquing means is torqued down with the tool operated by the operator, releasing the grip provided by cam 50. The bolts in the tangs forming clips 86 and 88 are retracted and the CEDU is lifted upwardly to remove the button or pedestal 44 from the clevis 40 and the buttons or pedestals 90 from the clips 86 and 88.

This invention affords the following advantages listed hereinbelow without limitations:

1) The CEDU becomes fully accessible for maintenance through the aircraft access panel;

2) All the mounting requirements are located in a single location;

3) The clevis is remote and doesn't require sight to accommodate the CEDU;

4) The mechanical tightening means is easily accessible and allows the operator to put a predetermined load on the pedestal attached to the CEDU;

5) The isolators on the CEDU are not disturbed;

6) Attains the required spring load on the pedestal without adversely affecting the operation of the isolators;

7) Orients the CEDU to provide ease of access;

8) Orients the drain lines in the CEDU so that the will be in a self draining direction; and 9) The sheet metal bracket is bent to mount on the existing engine case studs at a weight and cost that is less than the heretofore known design.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. Means for removably mounting an engine component to the case of an engine that is adapted to be mounted in an aircraft comprising an elongated bracket having means for mounting said bracket to said case, said elongated bracket having at one end a clevis defining a pair of support arms adapted to releasably support a pedestal attached to the engine component, movable means attached to said clevis for securing said pedestal in position, torquing means supported to said elongated bracket having a tool engagement end remotely spaced from said moveable means operatively connected to said movable means for positioning said movable means to engage and disengage said pedestal for attaching and releasing said engine component, said torquing means being engagable from an access opening formed in a wall of said aircraft, said elongated bracket including a pair of axially extending arms each of which include hook means attached to the ends thereof adapted to engage complementing pedestals formed on said engine component to releaseably support said engine component whereby the operator can free himself from holding said engine component in place during installation and removal of said engine component.

2. Means for removably mounting an engine component to the case of an engine that is adapted to be mounted in an aircraft as claimed in claim 1 wherein said movable means includes a pair of cam elements each having tapered operating surfaces in sliding relationship relative to each other.

3. Means for removably mounting an engine component to the case of an engine that is adapted to be mounted in an aircraft as claimed in claim 2 wherein one of said pair of cam elements include means for preventing rotation of said pair of cam elements relative to each other.

4. Means for removably mounting an engine component to the case of an engine that is adapted to be mounted in an aircraft as claimed in claim 3 wherein said rotation prevention means includes a fixed pin, an axial extending slot in said one of said pair of cam elements adapted to slidably receive said pin.

5. Means for removably mounting an engine component to the case of an engine that is adapted to be mounted in an aircraft as claimed in claim 4 wherein one of said cam elements includes a surface engageable and disengagable with a surface on said pedestal, said slot includes side surfaces contoured to assist the said one cam element from separating from said surface on said pedestal when said one cam element is in disengagement operation.

6. Means for removably mounting an engine component to the case of an engine that is adapted to be mounted in an aircraft as claimed in claim 5 wherein said clevis includes a pair of upstanding opposing lip means adapted to slidably receive said pedestal.

7. Means for removably mounting an engine component to the case of an engine that is adapted to be mounted in an aircraft as claimed in claim 6 wherein said torquing means includes an elongated rod having a threaded portion on one end thereof, a threaded portion in a bore formed in one of said pair of cam elements for threadably receiving said threaded portion of said elongated rod and means in said bracket for rotary supporting said elongated rod.

8. Means for removably mounting an engine component to the case of an engine that is adapted to be mounted in an aircraft as claimed in claim 7 including a cross bracket attached to one end of said elongated bracket for defining said clevis.

9. Means for removably mounting an engine component to the case of an engine that is adapted to be mounted in an aircraft as claimed in claim 8 wherein said bracket includes a cut-out portion centrally formed in one end of said bracket having a pair of opposing arm portions extending toward the end of said bracket adjacent to said clevis, said pair of opposing arm portions being parallelly bent inwardly and outwardly to define an operating space for said torquing means.

10. Means for removably mounting an engine component to the case of an engine that is adapted to be mounted in an aircraft as claimed in claim 1 wherein said engine component includes vibratory isolators defining an isolating system with a predetermined spring rate, said elongated bracket having a predetermined spring rate and said movable means exerting a predetermined load on said elongated bracket when said movable means is positioned for attaching said engine component such that the spring rate of said elongated bracket complements the spring rate of said isolating system.

* * * * *